United States Patent [19]

Wachi et al.

[11] Patent Number: 4,517,838
[45] Date of Patent: May 21, 1985

[54] THERMAL MASS FLOW METER

[75] Inventors: Akira Wachi; Munehisa Hayashi, both of Tokyo, Japan

[73] Assignee: Ohkura Electric Co., Ltd., Tokyo, Japan

[21] Appl. No.: 550,389

[22] Filed: Nov. 10, 1983

[51] Int. Cl.³ .............................................. G01F 1/68
[52] U.S. Cl. ..................................................... 73/204
[58] Field of Search ................................... 73/202, 204

[56] References Cited

U.S. PATENT DOCUMENTS 2,586,060  2/1952  Kronbeger ............................ 73/204
2,896,452  7/1959  Cogniat ................................. 73/204
3,938,384  2/1976  Blair ..................................... 73/204

FOREIGN PATENT DOCUMENTS 110920  7/1982  Japan ..................................... 73/204

Primary Examiner—Herbert Goldstein
Attorney, Agent, or Firm—Oblon, Fisher, Spivak, McClelland & Maier

[57] ABSTRACT

The disclosed thermal mass flow meter has a heat conductive case having a fine groove and a sensor pipe disposed in said fine groove so as to carry fluid flow to be measured.

5 Claims, 2 Drawing Figures

THERMAL MASS FLOW METER

BACKGROUND OF THE INVENTION

1. Field of the Invention

This invention relates to a thermal mass flow meter, and more particularly the invention relates to an improvement of a thermal mass flow meter having a sensor pipe defining a passage of gas flow to be measured and an electric heater heating the sensor pipe, so that the mass flow rate of the gas in the sensor pipe is determined by measuring a temperature difference between an upstream point and a downstream point of the sensor pipe.

2. Description of the Prior Art

A typical thermal mass flow meter of the prior art is schematically shown in FIG. 1. The gas flow 1 to be measured in a main pipe 2 consists of laminar flow elements 3. The pressure difference across the upstream and the downstream of the laminar flow elements 3 is proportional to the volume flow rate Q of the gas flow 1 to be measured. This pressure difference causes a minor gas flow $\Delta Q$ of laminar type in a sensor pipe 4 which is a branch to the main pipe 2.

Heaters 5 and 6 are wound on the sensor pipe 4. The heaters 5 and 6 are energized by a power source 7, so that the sensor pipe 4 is heated to a certain temperature, for instance in a range of about 50°–100° C. The heaters 5 and 6 also act as temperature sensors, and a bridge circuit is formed by the heaters 5, 6 and resistors $R_1$ and $R_2$, as shown in the figure. An output voltage $\Delta E$ is produced across the joint between the two heaters 5, 6 and the joint between the resistors $R_1$, $R_2$. When the minor flow in the sensor pipe 4 is zero, i.e., $\Delta Q=0$, the bridge circuit is balanced and its output voltage is also zero, i.e., $\Delta E=0$. When the minor flow $\Delta Q$ assumes a finite value, the temperature of the upstream heater 5 is reduced while the temperature of the downstream heater 6 is increased. Accordingly, the output voltage $\Delta E$ also assumes a finite value, which value is proportional to the flow rate of the gas flowing through the sensor pipe 4. Since the branching ratio $\Delta Q/Q$ is constant, the mass flow rate in the main pipe 2 can be determined from the above output voltage $\Delta E$.

The reason why the minor flow $\Delta Q$ in the sensor pipe 4 causes a temperature reduction in the heater 5 and a temperature rise in the heater 6 is in that the minor flow $\Delta Q$ of the gas in the sensor pipe 4 transmits heat to the downstream. Such transmission of heat may occur outside the sensor pipe 4. In FIG. 1, if a weak wind blows from the heater 5 to the heater 6, heat is transmitted from the left to the right in the outside of the sensor pipe 4, and the heater 5 is cooled while the heater 6 is heated to raise its temperature, as if a minor flow $\Delta Q$ was occurring in the sensor pipe 4 so as to produce an erroneous output voltage $\Delta E$. To avoid such erroneous output voltage due to wind, the heater-carrying portion of the sensor pipe is placed in a sensor housing 8.

Although the sensor housing 8 eliminates the adverse effects of the wind, it cannot solve the problem of posture error. More particularly, the initial adjustment of the thermal mass flow meter is effected while keeping the heaters 5 and 6 horizontally, and if the heater 6 is for instance located at a level higher than the heater 5 during the usage, heat is convected from the heater 5 to the heater 6, so that a drift in the zero point is caused in the flow meter, as a posture error. The magnitude of the posture error is maximized when the heater 6 is positioned immediately above the heater 5 or when the posture of the flow meter is turned by 90° relative the horizontal posture. It is undesirable to have a large zero point drift for a small change of the posture. Especially, in the case of a flow meter mounted on a car, such zero point drift due to the posture error is fatal.

As a means to remove the posture error, the Japanese Patent Laying-open Publication No. 10413/82 teaches the use of an evacuated sensor housing 8 which encloses the heaters 5 and 6 as shown in FIG. 1. With the evacuated sensor housing 8, the heat leakage from the heaters 5 and 6 is mostly in the form of radiation to the outside of the sensor housing 8 and not in the form of convection, so that theoretically speaking, no posture error can occur. However, such sensor housing 8 must be made airtight even after being evacuated, so that its structure tends to be costly. Besides, an evacuating step is necessary during the manufacture. The heat conductivity of air at 1 atmospheric pressure is kept substantially unchanged even after evacuation unless the pressure is reduced below 0.01 mmHg, so that the heat conductivity is unstable unless the vacuum pressure is kept below 0.001 mmHg. It is very difficult to maintain such a high degree of vacuum for an extended period of time.

As another means for reducing the posture error due to heat convection, Japanese Patent Publication No. 23094/81 discloses the use of foamed thermal insulator 9, such as foamed polyurethane which covers the heaters 5 and 6 as shown in FIG. 1. The heat from the heaters 5 and 6 leaks to the outside of the thermal insulator 9 by way of thermal conduction and thermal radiation therethrough. Since thermal convection has nothing to do with the heat transfer in the thermal insulator 9, the posture error can be eliminated. Japanese Patent Laying-open Publication No. 110920/82 discloses a foamed thermal insulator 9 which also acts as a sensor casing 8.

The method of using the foamed thermal insulator has a shortcoming in that it has a large time delay in the change of the output voltage $\Delta E$ in response to a step-like change in the minor flow $\Delta Q$. The reason for the delay in the response is in that the heat conductivity of the foamed thermal insulator 9 is smaller than that of air. In short, the thermal capacity of the foamed thermal insulator 9 is large, so that the delay in the response is caused. A step-like increase in the minor flow $\Delta Q$ will reduce the temperature of the heater 5 while increasing the temperature of the heater 6, and it takes time before thermal equilibrium is reached at new temperature distribution. It takes a long time for the temperature change at the heaters to reach the outer surface of the foamed thermal insulator 9. In general, the foamed thermal insulator 9 made of organic substance has a low heat resistivity, so that the temperature of the heaters 5 and 6 cannot be raised too high. This is one of the causes for limiting the sensitivity of the flow sensor or flow meter (output voltage $\Delta E$/minor flow $\Delta Q$).

SUMMARY OF THE INVENTION

Therefore, an object of the present invention is to obviate the above-mentioned shortcomings of the prior art by providing an improved thermal mass flow meter.

Another object of the invention is to provide a novel thermal mass flow meter which has quick response and is free from posture error caused by change in heat convection at different postures, without using any vacuum sensor case and any thermal insulator.

To fulfil the above-mentioned object, a thermal mass flow meter according to the present invention comprises a sensor pipe carrying heating means mounted thereon, a temperature detector detecting a temperature difference across said heating means, and a case having a groove with an equivalent diameter of less than 4 mm, said sensor pipe being disposed in said groove of the case.

BRIEF DESCRIPTION OF THE DRAWINGS

For a better understanding of the invention, reference is made to the accompanying drawings, in which.

Like parts are designated by like numerals and symbols throughout different views of the drawings.

DESCRIPTION OF THE PREFERRED EMBODIMENT

Figure 1:
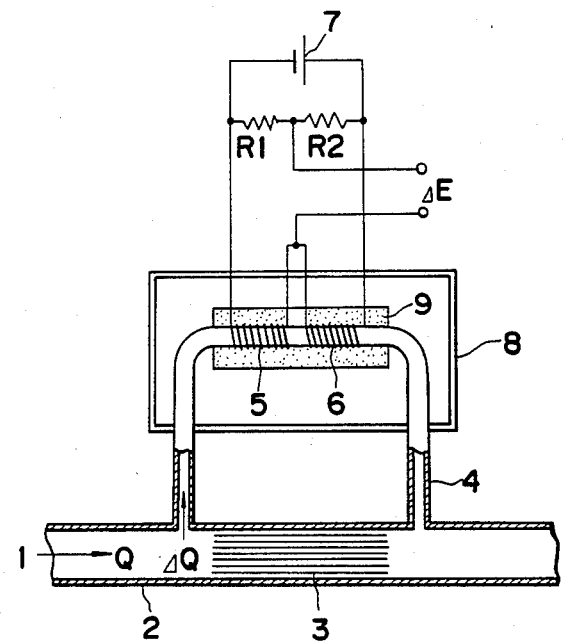
FIG. 1 is a partially cutaway schematic view of a conventional thermal masss flow meter.
Figure 2:
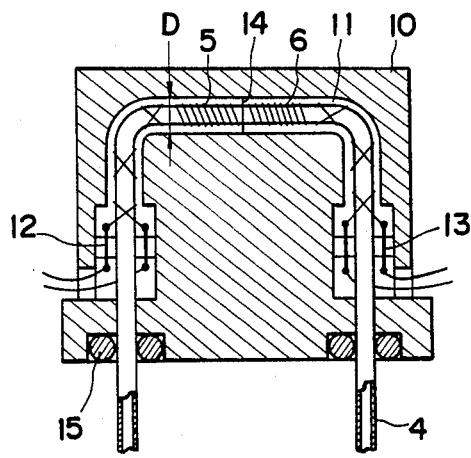
FIG. 2 is a partially schematic sectional view of an essential portion of a thermal mass flow meter according to the present invention.

Referring to FIG. 2 showing a preferred embodiment of the invention, a case 10 has a groove 11 with an inside diameter D, and a sensor pipe 4 having heaters 5 and 6 wound thereon is disposed in the groove 11. Electricity to the heaters 5 and 6 is applied through relaying terminals 12 and 13. In the illustrated embodiment, a thin annular or flange-like spacer 14 is mounted on the sensor pipe 4 at the joint between the heaters 5 and 6, so as to hold the sensor pipe 4 substantially at the center of the groove 11. The spacer 14 is made of a material which has a high heat resistivity and a small heat conductivity, such as polyimide. O rings 15 facilitate the connection of the sensor pipe 4 to a main pipe 2 (FIG. 1).

The sensor pipe 4 of FIG. 2 branches the flow of fluid being measured in the main pipe 2 in the same manner as the flow meter of FIG. 1. The heaters 5 and 6 of the flow meter of the invention are also connected to resistors $R_1$ and $R_2$, so as to form a similar bridge circuit as that of FIG. 1, so as to produce an output voltage $\Delta E$ as described in the foregoing by referring to FIG. 1. Since the branching of the main pipe 2 to the sensor pipe 4 and the connection for the bridge circuit do not constitute essential portion of the invention, details thereof will not be dealt with here.

The inventors have found through experiments that, the smaller the inside diameter D of the groove 11 is, the less the occurrence of the convection in the groove 11 is and the less the posture error becomes. The spacer 14 acts not only as a holder of the sensor pipe 4 in the groove 11 but also as a separator for preventing the heat transmission between the heaters 5 and 6.

EXAMPLE

A test model of the mass flow meter of the invention as shown in FIG. 2 was prepared with the materials and dimensions listed below, and the following operating characteristics were determined by actual measurement on the test model.

1. Sensor pipe 4: material, 316 stainless steel; inside diameter of 0.25 mm, outside diameter of 0.35 mm, a wall thickness of 0.05 mm 2. Heaters 5, 6 (temperature-sensitive resistors): Ni(70%)-Fe(30%) alloy wire with a diameter of 0.01525 mm; temperature coefficient of about 0.4%; each heater wire being wound with turns in tight contact over a width of 6 mm, a gap of 0.5 mm between heaters 5 and 6; each heater with a resistance of 360 Ω at room temperature 3. Power source 7: 13 V; sensor pipe temperature rise of about 94° C. at the spacer 14

4. Output: 0–110 mV for 0–5 SCCM(Standard Cubic Centimeter per Minute) of $N_2$ gas, non-linearity error of less than 2%

5. Response: time constant of 2.0 sec, in terms of 63.2% response time for step-like change in the flow rate 6. Posture error: 0.15% of posture error by 90° turn, with a groove diameter D=2 mm The above posture error was determined by carrying out the adjustments of both the zero point and the measuring span while keeping the two heaters 5 and 6 on the same horizontal level, turning the sensor pipe 4 by 90° so as to place the heater 6 immediately above the heater 5, measuring the shift of the output voltage, and calculating the posture error being defined as a quotient of the thus measured shift over the measuring span output. The above value of the posture error 0.15% does not cause any difficulty for all practical purposes.

The posture error was found to increase with the increase of the inside diameter D of the groove 11, as shown by the test result of the following table 1.

TABLE 1

| Groove 11 | Groove inside diameter (mm) | Spacer 14 | Posture error (%) after 90° turn |
|---|---|---|---|
| none | — | none | 80 |
| used | 6 | none | 34 |
| used | 4 | none | 7 |
| used | 2 | none | 0.5 |
| used | 2 | used | 0.15 |

As can be seen from Table 1, the posture error is rapidly reduced when the inside diameter D of the groove 11 used becomes smaller than about 4 mm. The posture error is reduced with the reduction of the inside diameter D of the groove 11, but when the inside diameter D is smaller than 1 mm, it becomes difficult to hold the sensor pipe 4 exactly at the center of the groove 11, and the assembling operation becomes cumbersome. Accordingly, there is a limit in reducing the inside diameter of the groove 11.

As to the time constant T of the variation of the output in response to the step-like change of the minor flow $\Delta Q$ in the sensor pipe 4, there is the following relationship.

$$T = H/C \qquad (1)$$

here,

H: per-unit-length thermal capacity of the sensor pipe, including the heaters $[JK^{-1}m^{-1}]$, C: per-unit-length cooling constant of the sensor pipe $[JK^{-1}m^{-1}S^{-1}]$.

When the foamed thermal insulator is used, the thermal capacity in the numerator of the above equation increases by an amount corresponding to that of the thermal insulator, and the time constant increases accordingly. On the other hand, in the case of the present invention, only the heat capacity of the air in the groove 1 is added to the per-unit-length heat capacity H, and the value of this heat capacity of the air is much smaller than that of the foamed thermal insulator.

In the case of the present invention, the gap between the heaters 5, 6 and the case 10 is small, so that considerable heat leakage to the case 10 occurs through heat conduction. Accordingly, the cooling constant in the denominator of the equation (1) is large, and the time constant becomes small. In addition to the heat conduction, the heat radiation assists the heat leakage to the case 10, so that it is preferable to roughen and blacken the inner surface of the groove. As to the material of the case 10, it is preferable to render as large a heat conductivity as possible. The inventors have found that a case 10 made by die casting of an aluminium alloy proved the best, while a case 10 made of shaped plastics resulted in an inferior response.

It is noted here that the heaters 5 and 6 of FIG. 1 and FIG. 2 act both as heater elements and as temperature sensor elements. In certain flow meter systems of the prior art, single-purpose heaters are wound on a sensor pipe for heating it with a constant power and separate temperature-sensitive resistances are wound on the sensor pipe at upstream and downstream positions. The present invention can be used with such systems having separate heaters and temperature sensors.

In other flow meter systems, an electric current is directly applied to the sensor pipe 4, and temperature difference at a central portion thereof across an upstream position and a downstream position is measured by a temperature-sensitive resistance means or a thermocouple means. The present invention can be also directly applied to such systems which heat the sensor pipe by an electric current therethrough.

In the foregoing, the groove 11 of round shape is implied, but it is apparent to those skilled in the art that similar effects can be achieved by using grooves of other shapes such as rectangular or triangular shape. What is important is to prevent heat convection by disposing the sensor pipe 4 and the case 10 as close as possible. As an extreme example, the similar effects as those of the invention can be achieved by disposing the sensor pipe between parallel boards which are disposed very close to each other.

To further reduce the heat convection, inorganic thermal insulator such as quartz fibers may be stuffed very lightly in the sensor pipe 11. Since the inside diameter of the sensor pipe 11 is very small to minimize the heat convection, the stuffing of a very small amount of the thermal insulator therein substantially eliminates the heat convection. The increase of thermal capacity by the addition of such thermal insulator is so small that the time constant is substantially unchanged.

In the above-mentioned embodiment, a constant voltage is implied for energizing the heaters, but such heating can be effected on a constant current basis. Although the measurement of gas flow has been described in the embodiment, the meter of the invention can be also used for measuring flow rate of liquid.

To facilitate assembly, the case 10 may be formed of two parts of matching shapes, and such two parts may be assembled while inserting the sensor pipe 4 in a manner similar to coupling a plug with a socket in electric appliances.

As described in detail in the foregoing, a thermal mass flow meter according to the present invention simultaneously achieved the reduction of the posture error and the improvement of the response by disposing the sensor pipe in a groove of specific equivalent diameter formed in a case. Besides, the thermal mass flow meter of the invention does not use any vacuum element or any massive thermal insulator, so that it is free from deterioration of the vacuum pressure and the thermal insulation due to aging, so that a very high reliability can be provided easily. Thus, the invention contributes greatly to the industry.

What is claimed is:

1. A thermal mass flow meter, comprising a case whose heat conductivity is much larger than that of air, a fine groove with an equivalent diameter of not larger than 4 mm bored through the case, a sensor pipe disposed in said fine groove so as to carry a fluid flow to be measured therethrough, and means for supporting said sensor pipe in said groove in spaced relationship with said case, and a heating and temperature-sensing means mounted on said sensor pipe.

2. A thermal mass flow meter as set forth in claim 1, wherein said heating and temperature-sensing means is made of two windings wound on said sensor pipe and said means for supporting comprises a flange-like spacer disposed between said two windings.

3. A thermal mass flow meter as set forth in claim 1, wherein said meter further comprises a thermal insulator stuffed between inner surface of said groove and said sensor pipe.

4. A thermal mass flow meter as set forth in claim 1, wherein said heating and temperature-sensing means consists of a pair of windings which are connected both to a power source and to a voltage-detecting circuit for heating and detecting the temperature.

5. A thermal mass flow meter as set forth in claim 1, wherein said sensor pipe is adapted to carry an electric current for heating and said heating and temperature-sensing means consists of two temperature-sensitive resistances mounted on said sensor pipe at upstream and downstream positions thereof.

* * * * *

UNITED STATES PATENT AND TRADEMARK OFFICE
CERTIFICATE OF CORRECTION

PATENT NO. : 4,517,838
DATED : May 21, 1985
INVENTOR(S) : Wachi et al

It is certified that error appears in the above-identified patent and that said Letters Patent is hereby corrected as shown below:

On the title page;

The Priority Information has been omitted, should read as follows;

- - [30] FOREIGN/PCT APPLICATIONS- -

JAPAN　　　　　　　　　　199236/1982　　　　　　　　　11/12/1982

Signed and Sealed this

Tenth Day of September 1985

[SEAL]

Attest:

DONALD J. QUIGG

*Attesting Officer*　　　*Acting Commissioner of Patents and Trademarks - Designate*